(12) United States Patent
Manaka

(10) Patent No.: US 7,448,699 B2
(45) Date of Patent: Nov. 11, 2008

(54) ELECTRO MECHANICAL BRAKE, CONTROL DEVICE AND CONTROL METHODS

(75) Inventor: Toshio Manaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/720,481

(22) Filed: Nov. 25, 2003

(65) Prior Publication Data

US 2004/0104619 A1 Jun. 3, 2004

(30) Foreign Application Priority Data

Nov. 26, 2002 (JP) ............................. 2002-341624

(51) Int. Cl.
*B60T 13/00* (2006.01)
(52) U.S. Cl. ...................... 303/20; 188/72.8; 188/71.9
(58) Field of Classification Search ................. 303/191, 303/89, 125, 155, 192, 3, 20, 265; 188/71.9, 188/72.8
See application file for complete search history.

(56) References Cited

U.S. PATENT DOCUMENTS

| | | | | |
|---|---|---|---|---|
| 4,542,809 | A | * | 9/1985 | Crossman .................. 188/72.8 |
| 6,139,117 | A | * | 10/2000 | Shirai et al. ..................... 303/3 |
| 6,370,466 | B1 | | 4/2002 | Hada et al. |
| 2005/0173977 | A1 | | 8/2005 | Fischer |

FOREIGN PATENT DOCUMENTS

| | | | |
|---|---|---|---|
| DE | 198 38 886 | A1 | 10/1999 |
| DE | 198 26 130 | A1 | 12/1999 |
| DE | 198 38 885 | A1 | 3/2000 |
| DE | 199 01 581 | A1 | 5/2000 |
| DE | 101 18 262 | A1 | 10/2002 |
| EP | 1 085 240 | A1 | 3/2001 |
| GB | 2 338 274 | A | 12/1999 |
| JP | 58071253 | A * | 4/1983 |
| JP | 63-22271 | A | 2/1988 |
| JP | 2-28041 | A | 1/1990 |
| JP | 11-99889 | A | 4/1999 |
| JP | 2000-272485 | A | 10/2000 |
| JP | 2000-313321 | A | 11/2000 |
| JP | 2001-163198 | | 6/2001 |
| WO | 03097421 | A1 | 11/2003 |

OTHER PUBLICATIONS

Japanese Office Action dated Apr. 1, 2005.
English translation of a Japanese Office Action dated Aug. 22, 2006 (four (4) pages).

* cited by examiner

*Primary Examiner*—Robert A. Siconolfi
*Assistant Examiner*—James K Hsiao
(74) *Attorney, Agent, or Firm*—Crowell & Moring LLP

(57) ABSTRACT

When a vehicle is suddenly stopped by turning off an ignition key switch on a way of a slope road, a braking force maintaining control is not preformed, and it often occurs that the vehicle moves down along the slope road. To prevent such occurrence, an electro-mechanical braking device for maintaining the braking force is provided so that the vehicle is parked securely. The electro-mechanical braking device includes a parking brake mechanism for maintaining the brake force even when an ignition key switch (power supply switch) of the vehicle is turned off. When the power supply switch (ignition key switch) of the vehicle is turned off with a braking pedal being stroked or a braking operation signal being present, the parking-brake mechanism is activated (the brake force is maintained).

1 Claim, 6 Drawing Sheets

ELECTRO MECHANICAL BRAKE, CONTROL DEVICE AND CONTROL METHODS

BACKGROUND OF THE INVENTION

1. Field of the Invention

This invention relates to an electro-mechanical brake device for an automobile, and more particularly to a parking mechanism and a control method of maintaining a braking force even when a power supply is turned off.

2. Description of the Related Art

JP-A-2001-163198 discloses a vehicle control device in which a braking force maintaining instruction is outputted to a braking device when an automatic stall condition of an engine is satisfied.

In the patent document mentioned above, the braking force maintaining instruction output and the braking force releasing control are carried out based on an automatic engine stop condition, an automatic engine stop release condition and restart condition of the engine. However, any consideration has not been paid to the fact that the braking force is to be maintained at the time when the vehicle is parked on a way of a slope road. This causes a problem that the braking force maintaining control is not performed in case that the vehicle is suddenly stopped by turning off an ignition key switch on a way of the slope road. In that case, there is a possibility that the vehicle is ready to move down along the slope road.

SUMMARY OF THE INVENTION

It is an object of this invention to provide an electro-mechanical braking device which outputs a braking force to maintain the vehicle to be stopped securely under the environments that the vehicle is parked on a way of the sloping road in case the vehicle is parked by turning off the ignition key switch, or in case power is not supplied to the electro-mechanical brake or a control signal is not applied thereto.

In order to solve the problem as mentioned above, this invention provides a control device for controlling a motor drive brake including a parking brake mechanism for maintaining the braking force in case power is not supplied or a control signal is not applied. The control device detects whether a braking pedal is stepped on or a brake operation signal is present and also detects that the ignition key switch or the power supply switch of the vehicle is turned off, and further controls the parking brake mechanism so that the braking force may be maintained on the basis of these detection results.

Also, in order to maintain the braking force of the parking brake mechanism, a motor for generating the braking force is driven on the basis of the detection results describe above, and the parking brake mechanism for maintaining the braking force is operated at the time when the braking force reaches a predetermined value.

Other objects, features and advantages of the invention will become apparent from the following description of the embodiments of the invention taken in conjunction with the accompanying drawings.

DESCRIPTION OF THE INVENTION

Figure 1:
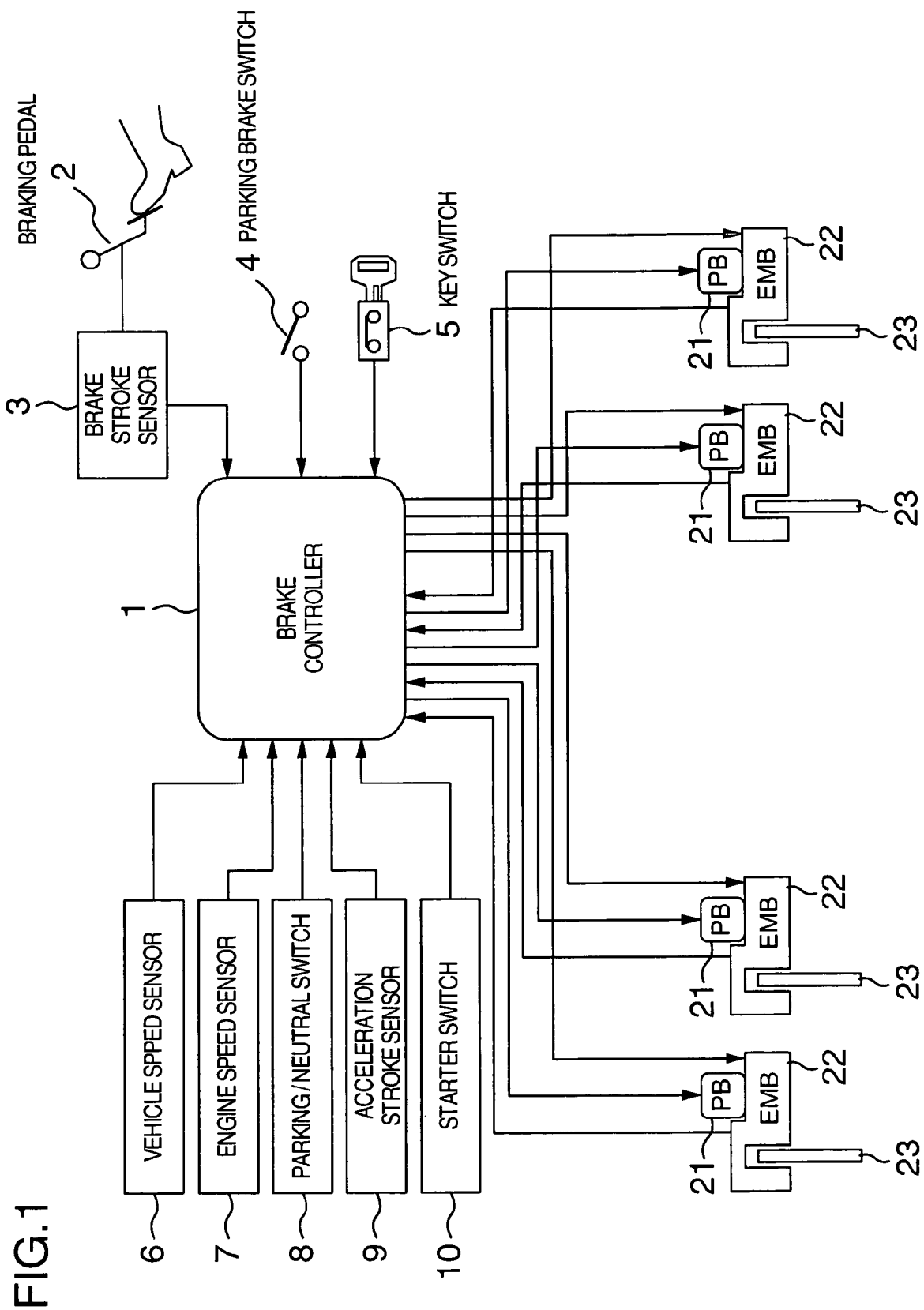
FIG. 1 is a diagram showing the constitution of this invention.

This invention provides the electro-mechanical parking brake mechanism for maintaining the braking force even when the power supply switch is turned off. In this invention, the parking brake mechanism is activated (the braking force is maintained) when an ignition key switch or the power supply switch of the vehicle is turned off under the condition that the braking pedal is stepped on or the braking operation signal is present.

Also, when the power supply switch (the ignition key switch) of the vehicle is turned off with the braking pedal being stepped on, the motor for generating the braking force is driven, and the parking brake mechanism for maintaining the braking force is activated at the time when the braking force reaches a predetermined value.

According to this invention, even when the power supply to the motor for generating the braking force is turned off, the braking force is maintained by the parking brake mechanism, so that the vehicle may be parked in case the vehicle is stopped on a way of the slope road.

Hereinafter, referring to the drawings, one embodiment of this invention is described in detail. However, this invention is not limited to the embodiment described below.

FIG. 1 is a diagram showing a system constitution of this invention. A braking controller 1 receives input signals such as a signal from a braking stroke sensor 3 for sensing a stroke amount of a braking pedal 2 by a driver, a signal from a parking brake switch 4 for turning on or off an activation of the parking brake mechanism, a signal from a key switch 5 or a power supply switch (or an ignition key switch) of the vehicle, a signal from a vehicle speed sensor 6 for sensing a speed of the vehicle, a signal from an engine speed sensor 7 for sensing an engine speed, a signal from a parking/neutral switch 8 which indicates whether a gear is connected or not connected (ON indicates a non-connection state and OFF indicates a connection state), a signal from an acceleration stroke sensor 9 for sensing a stroke amount of an acceleration pedal by the driver, and a signal from a starter switch 10 which indicates whether or not an starter of the engine is started up.

On the basis of the input signals described above, the braking controller 1 outputs a control signal for obtaining a necessary braking force to an electro-mechanical brake (EMB) 22. The input signals inputted to the braking controller as described above, the contents processed in the controller and the output signals outputted from the controller are not limited to the contents described above, but can include all of contents necessary for controlling the electro-mechanical brake. Also, the brake controller as described above can be incorporated into another control unit such as an engine control unit.

Figure 2:
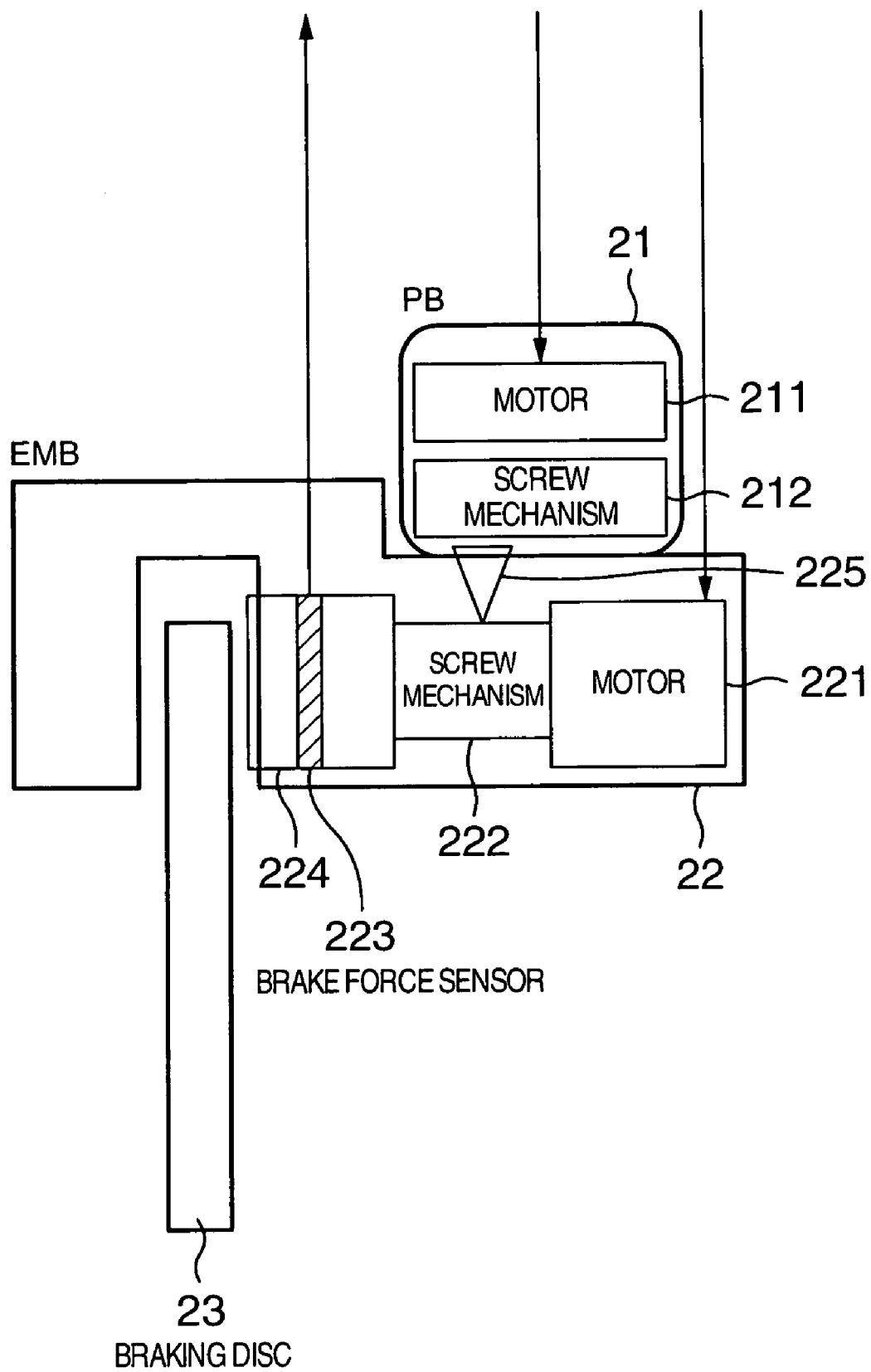
FIG. 2 is an explanatory diagram of an electro-mechanical braking device provided with a parking brake mechanism according to this invention.

FIG. 2 is an explanatory diagram showing the electro-mechanical brake (EMB) 22 provided with a parking brake mechanism. The electro-mechanical brake (EMB) 22 includes a motor 221, a screw mechanism unit 222 for converting a rotational movement of the motor into a reciprocal movement of the screw, a lock mechanism unit 225 for mechanically locking the reciprocal movement of the screw of the screw mechanism unit, an electro-mechanical parking brake mechanism unit 21 for switching between locking (fixing)/unlocking (loosing) of the lock mechanism unit, a braking pad 224 for generating a predetermined braking force by pressing the screw mechanism unit against a brake disc 23, and a braking force sensor 223 for detecting an actual braking force.

The electro-mechanical parking brake mechanism unit 21 includes a motor 211 such as a small sized motor and a screw mechanism unit 212 so that the screw mechanism of the electro-mechanical brake may be fixed or released by a driving force of the motor 211. According to such configuration, the electro-mechanical parking brake mechanism unit 21 and/or the lock mechanism unit 225 may lock the screw mechanism unit 222 under the condition that the braking pad 224 is being pressed against the brake disc 23 until a predetermined braking force is obtained from a rotational force of the motor 221. As a result, the braking force is maintained even when the rotational force (electric current value) of the motor 221 is made equal to zero (0).

The mechanism, configuration, structure and operation of the electro-mechanical brake and those of the parking brake merely indicate one example of this invention, and it is also possible to employ a mechanism using only the rotational movement of the motor, and another mechanism other than the screw mechanism in order to convert the rotational movement into the reciprocal movement.

Figure 3:
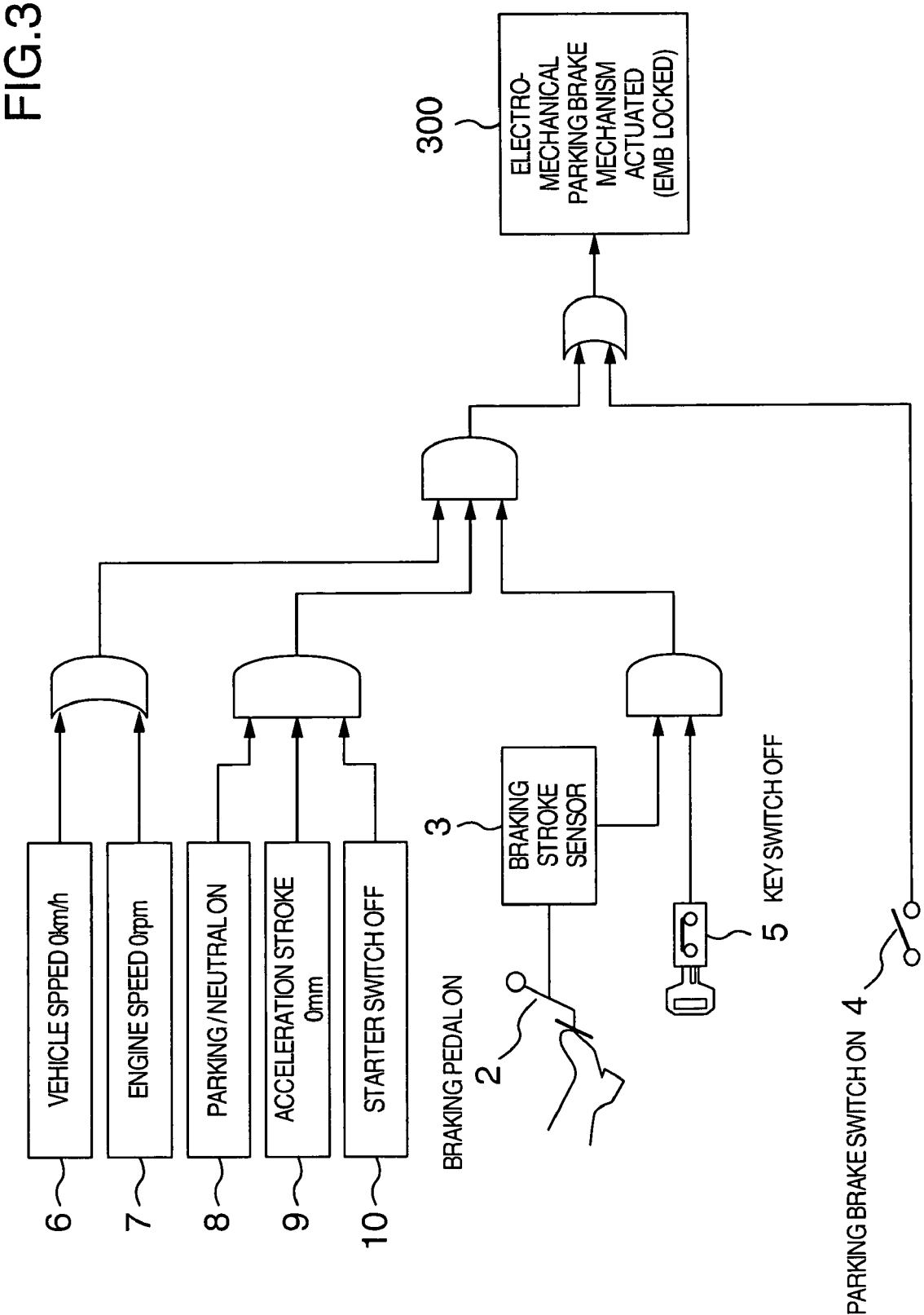
FIG. 3 is an operation logic circuit diagram of the parking brake mechanism of this invention.

FIG. 3 shows one example of a logic circuit diagram for activating the electro-mechanical parking brake mechanism by the braking controller of this invention. The electro-mechanical parking brake mechanism is activated to maintain the braking force under the condition that the braking pedal 2 is in on state (stepped on), and the key switch 5 (power supply switch of the vehicle) is turned off, and a speed of the vehicle is equal to 0 km/h (parked) or the engine speed is equal to 0 rpm (stopped), and the parking/neutral switch is turned on (the gear is not connected), and the acceleration stroke is equal to 0 mm (the acceleration pedal is not stepped on), and the starter switch is turned off (the starter is not started up).

In case the driver turns on the parking brake switch 4 regardless of these conditions indicated above, the electro-mechanical parking brake mechanism is activated to maintain the braking force.

The conditions as shown in FIG. 3 become the signals from each of the sensors (for example, 6, 7, 8, 9, and 10 in the Figure). The contents of these conditions are adopted in order to detect that the vehicle is completely parked and the driver has no intention of starting the vehicle.

In case, regardless of these conditions indicated above, the key switch is turned off with the braking pedal being stepped on, it is determined that the driver basically has an intention of stopping the vehicle. Accordingly, the electro-mechanical parking brake mechanism may be activated to maintain the braking force. The value of maintaining the braking force is selected from either one of a value corresponding to a stroke amount or stroke force of the braking pedal 2, a value obtained from correcting the stroking value or a predetermined value.

Figure 4:
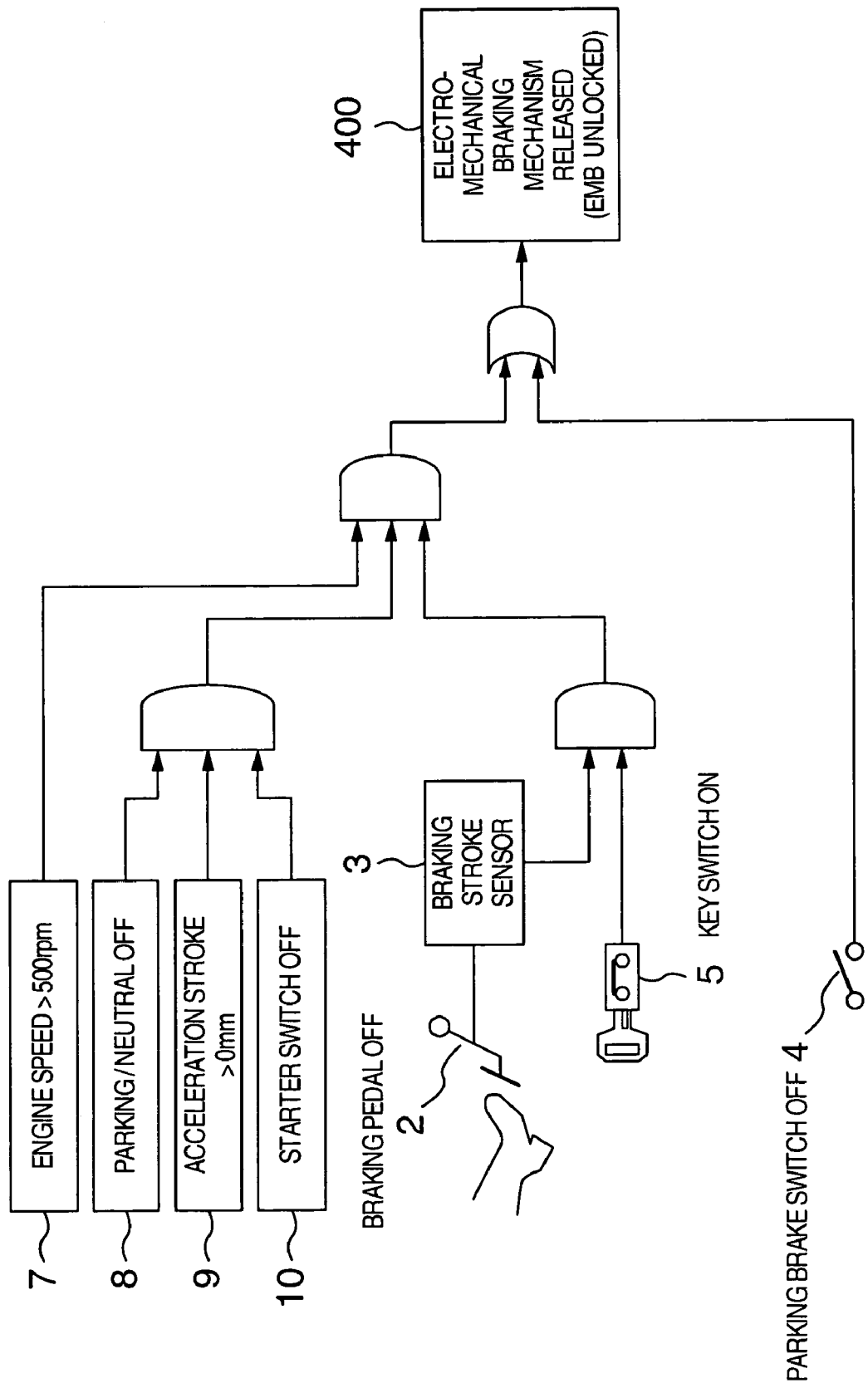
FIG. 4 is a release logic circuit diagram of the parking brake mechanism of this invention.

FIG. 4 shows one example of the logic circuit diagram for cancelling the braking force of the electro-mechanical parking brake mechanism through the braking controller of this invention. The electro-mechanical parking brake mechanism is released to maintain the braking force equal to zero, namely, the braking disc 23 is loosened under the conditions that the key switch 5 (power supply switch of the vehicle) is turned on with the braking pedal 2 being off state (not stepped on), and, when the engine speed is equal to, for example, 500 rpm (the starting of the engine is completed), the parking/neutral switch is turned off (the gear is connected) or the acceleration stroke is more than 0 mm (the acceleration pedal is stepped on) or the starter switch is turned off (the starter is not started up).

In case, regardless of the conditions indicated above, the driver turns off the parking brake switch 4, the motor 221 and the screw mechanism unit 222 are driven to release the electro-mechanical parking brake mechanism so that the braking force is maintained to be zero to loose the brake disc 23.

The engine speed more than 500 rpm as shown in FIG. 4 indicates the detection or confirmation of the fact that the starting of the engine is completed. Also, the parking/neutral switch being turned off (the gear being connected) and the acceleration stroke being more than 0 mm (the acceleration pedal being stepped on) indicate the detection or confirmation of the fact that the driver has intention of starting the vehicle. In case the vehicle such as an electric-powered vehicle or a hybrid electric vehicle is started by the motor, the engine speed being more than 500 rpm is not required owing to no provision of the engine.

Figure 5:
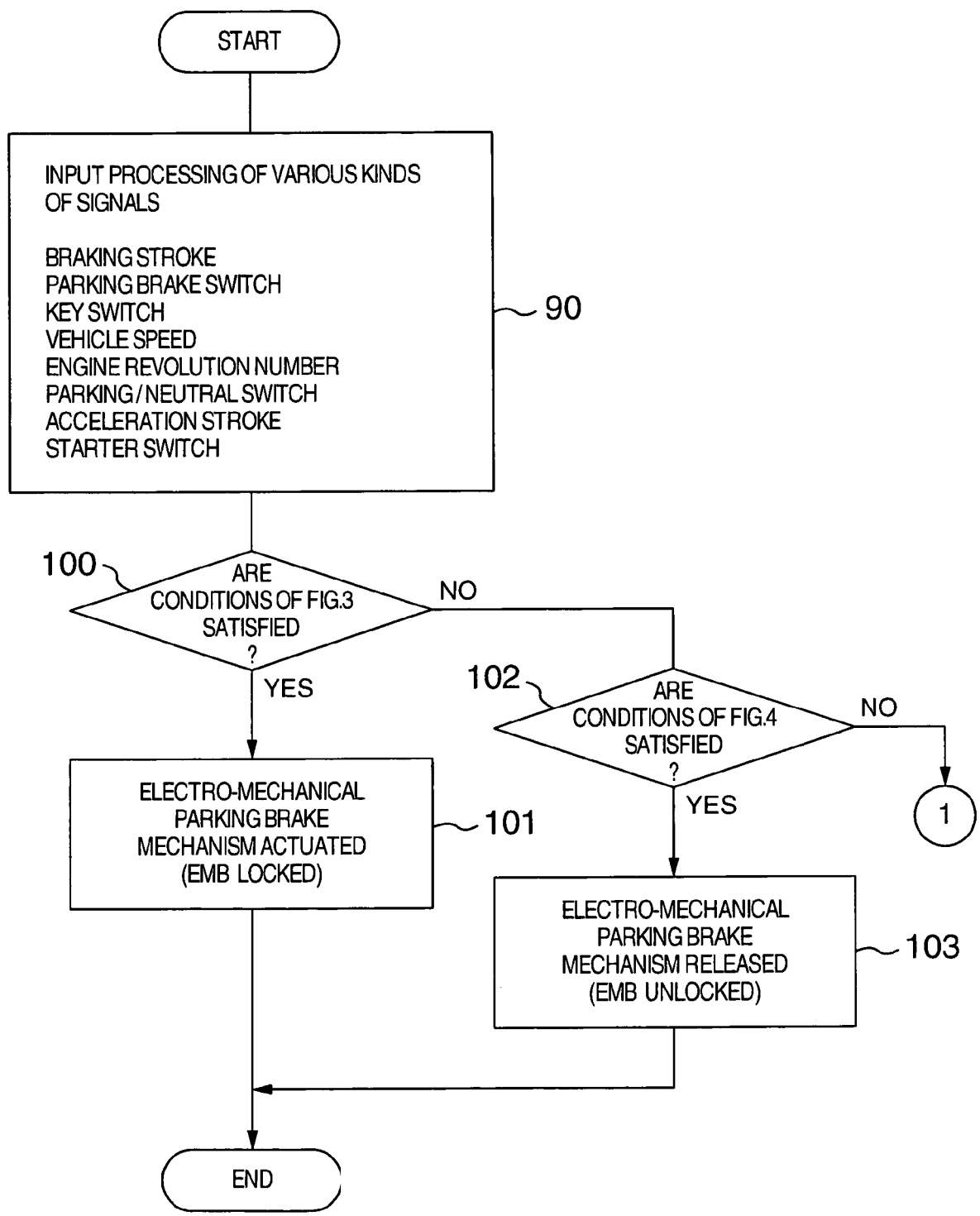
FIG. 5 is a flowchart of this invention.
Figure 6:
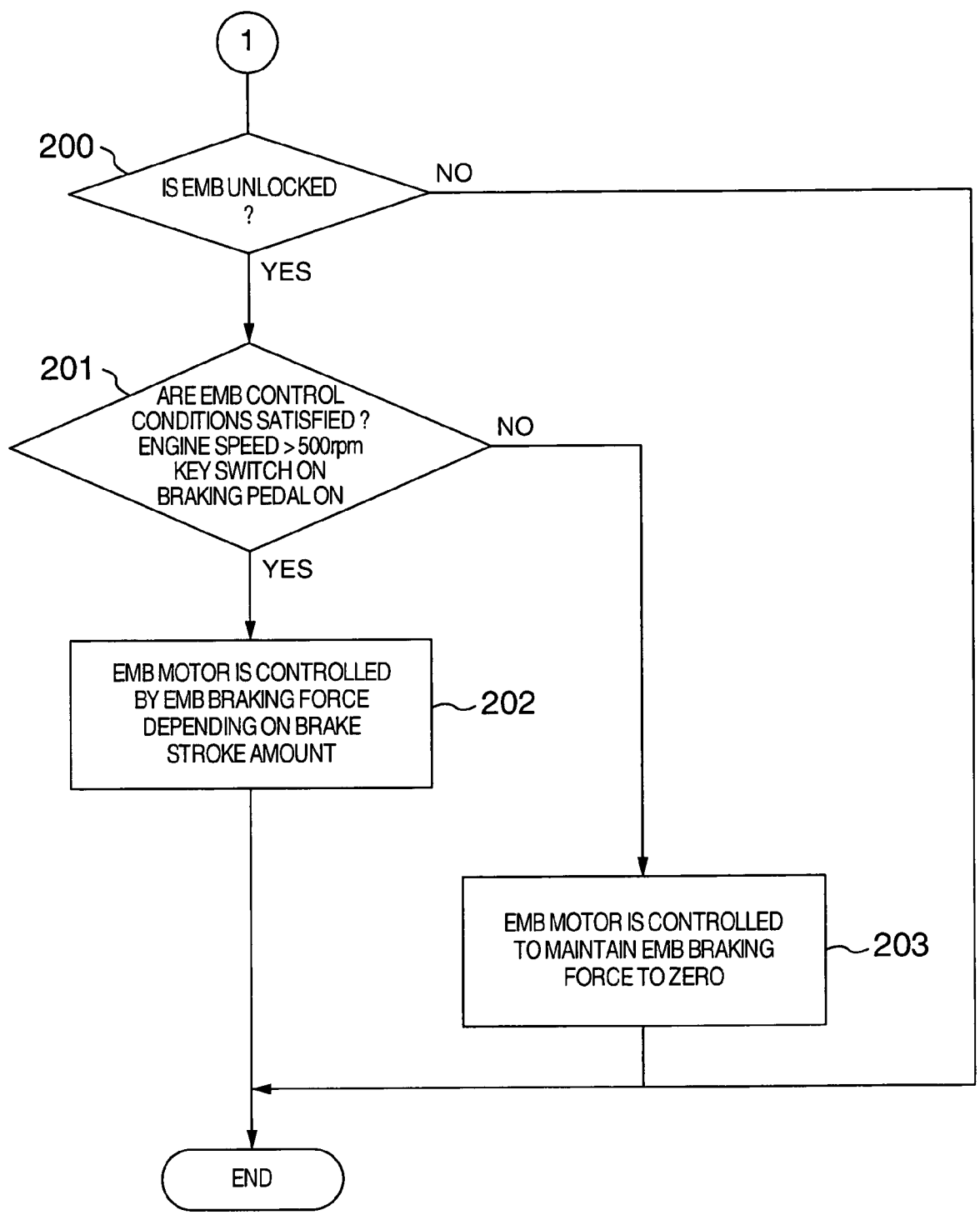
FIG. 6 is another flowchart of this invention.

FIGS. 5 and 6 show flowcharts of this invention, respectively. The brake controller performs processes of the flowcharts based on the input signals applied thereto. A step 90 performs an input processing for various kinds of signals. A step 100, for example, determines whether the conditions shown in FIG. 3 are satisfied or not. If satisfied (YES), a step 101 performs the processing of activating the electro-mechanical parking brake mechanism to maintain the braking force, and then terminates the processing. If not satisfied (NO), a step 102 determines whether the conditions as shown in FIG. 4 are satisfied or not. If satisfied (YES), the electro-mechanical parking brake mechanism is released to maintain the braking force to be zero. Namely, in this embodiment, the motor 221 and the screw mechanism unit 222 are driven to loose the braking disc 23, and then the processing is terminated.

In the step 102 performing the processing of determining whether the conditions are satisfied or not, if not satisfied (NO), the processing goes to a step 200 shown in FIG. 6.

The step 200 shown in FIG. 6 determines whether the electro-mechanical brake (EMB) 22 is unlocked or not (the braking force is maintained to be zero). In this embodiment, the processing is determined depending on the fact that an activation position of the small-sized motor 211 of the electro-mechanical parking brake mechanism 21 corresponds to either one of the fixing or loosing states of the screw mechanism of the electro-mechanical brake. If YES, a step 201 determines whether the conditions for a normal electro-mechanical brake control are satisfied or not. If NO, the electro-mechanical brake is locked, and then the processing is terminated.

If YES in the step 201, a step 202 performs the processing of controlling an electro-mechanical braking motor 221 so that the braking force may correspond to a braking stroke amount (stroking amount of the braking pedal). If NO, a step 203 performs the processing of controlling the motor 221 to maintain the braking force of the electro-mechanical brake to be zero, and then the processing is terminated.

As described above, according to this invention, the parking-brake mechanism is provided to maintain the braking force even when the power supply switch is turned off. When the power supply switch (ignition key switch) of the vehicle is turned off with the braking pedal being stepped on or the braking operation signal being present, the parking brake mechanism is activated (the braking force is maintained). In case the power supply switch (ignition key switch) of the vehicle is turned off with the braking pedal being stepped on, the motor for generating the braking force is driven to activate the braking force maintaining parking brake mechanism at the time when the braking force reaches a predetermined value. Even when the power supply to the motor for generating the braking force is turned off, the braking force is maintained by the parking brake mechanism so that the vehicle may be securely stopped when the vehicle is parked on a way of the slope road.

According to this invention, when the power supply or the control signal to the motor for generating the braking force is turned off, a logic operation of the input signals is performed to determine whether the braking force is maintained by the parking brake mechanism or not. If it is necessity to maintain the braking force, then it is controlled that the braking force is provided to the electro-mechanical brake. Accordingly, the vehicle is securely stopped without movement on a way of the slope road with the braking force being maintained.

What is claimed is:

1. An electro-mechanical braking device comprising:
   a motor for generating a rotation torque when power is supplied thereto;
   a braking pad responsive to the rotation torque of the motor for depressing a braking disc to generate a braking force;
   a locking mechanism for maintaining the braking force; and
   an electric parking brake mechanism responsive to reception of a control signal for controlling a parking brake state to actuate or release the lock mechanism,
   wherein the rotation torque generated by the motor is controlled to control the braking force on the basis of step-on amount of a braking pedal or a braking force instruction,
   the control signal for controlling the parking brake state is transmitted to the electric parking brake mechanism on the basis of a parking brake instruction, and the lock mechanism is actuated or released on the basis of the control signal, and
   the control signal for controlling the parking brake state is transmitted to the electric parking brake mechanism on the basis of detecting that a switch for a power source is changed to non-operative state when the braking pedal is stepped on or the braking force instruction is received, and the lock mechanism is actuated on the basis of the control signal so as to maintain the lock mechanism in an actuated state even upon termination of the braking force instruction, and wherein the control signal for controlling the parking brake state is transmitted to the electric parking brake mechanism on the basis of indicating that a starter of an engine is rendered to be non-connected state and detecting that the switch for the power source is changed to be non-operative state when the braking pedal is stepped on or the braking force instruction is received, and the lock mechanism is actuated on the basis of the control signal.

* * * * *